United States Patent [19]
Desai

[11] 3,938,043
[45] Feb. 10, 1976

[54] PUBLIC ADDRESS/RADIO SWITCHING SYSTEM

[75] Inventor: Samir Thakorbhai Desai, Roselle, Ill.

[73] Assignee: Motorola, Inc., Chicago, Ill.

[22] Filed: Feb. 10, 1975

[21] Appl. No.: 548,323

[52] U.S. Cl. .................... 325/18; 325/22; 179/1 A; 179/1 C; 179/1 SW; 179/2 E
[51] Int. Cl.² .......................................... H04B 1/40
[58] Field of Search....... 179/1 A, 1 B, 1 AT, 1 SW, 179/2 E, 1 C, 1 SG, 1 MG, 1 NC; 325/15, 16, 18, 21, 22

[56] References Cited
UNITED STATES PATENTS

| | | | |
|---|---|---|---|
| 2,766,378 | 10/1956 | Sundin et al. | 179/1 SW |
| 3,365,546 | 1/1968 | Kemper | 179/1 SW |
| 3,382,321 | 5/1968 | Lybarger et al. | 179/1 A |

Primary Examiner—Albert J. Mayer
Attorney, Agent, or Firm—James W. Gillman; Donald J. Lisa

[57] ABSTRACT

Public address add-on circuitry to a conventional radio includes a microphone coupled to a preamplifier which draws significant idle current, and is optimally operable when coupled to a proper load resistance. Permanently affixed and capacitively coupled to the audio input stage of the radio is a series element containing a semiconductor junction device and a resistor selected to properly load the microphone preamplifier. When switching from radio operation to public address the quiescent current of the microphone amplifier reduces the resistance of the junction from a high to a low value thereby allowing the preselected resistor to load the microphone. Semiconductor action further disables the tuner portion of the receiver.

14 Claims, 2 Drawing Figures

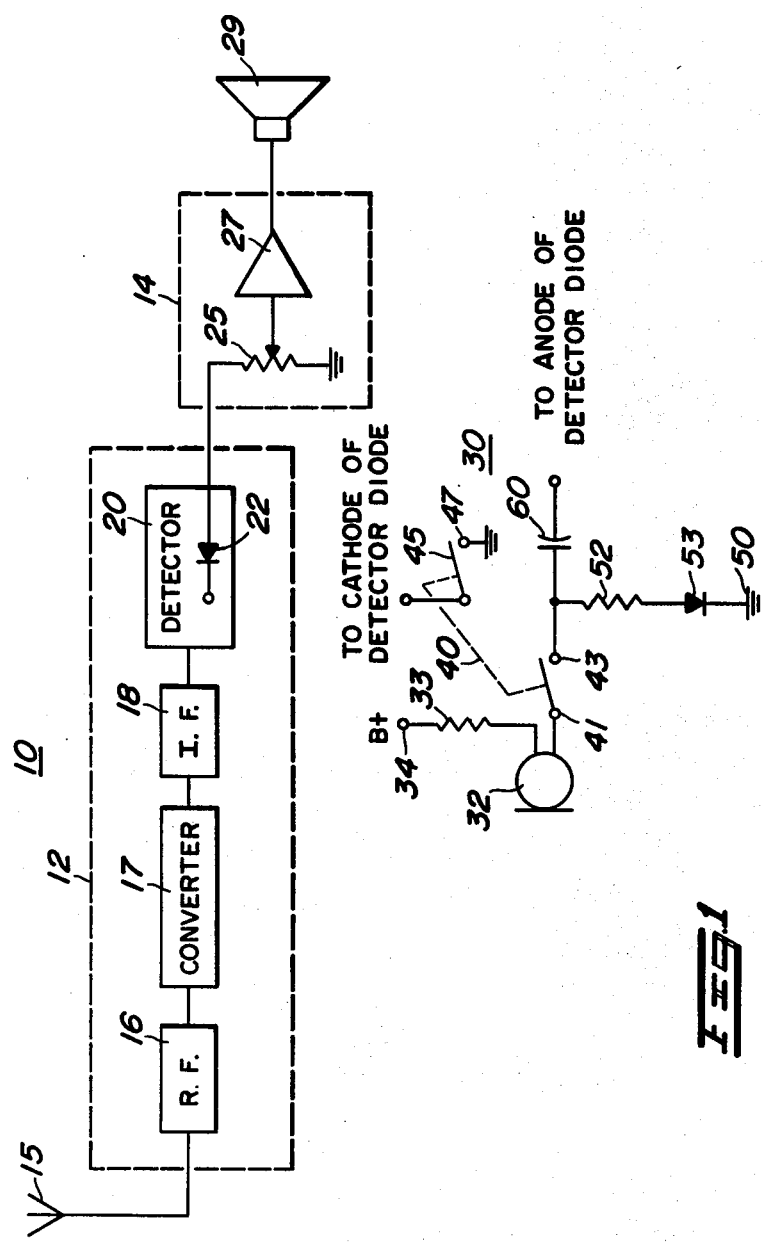

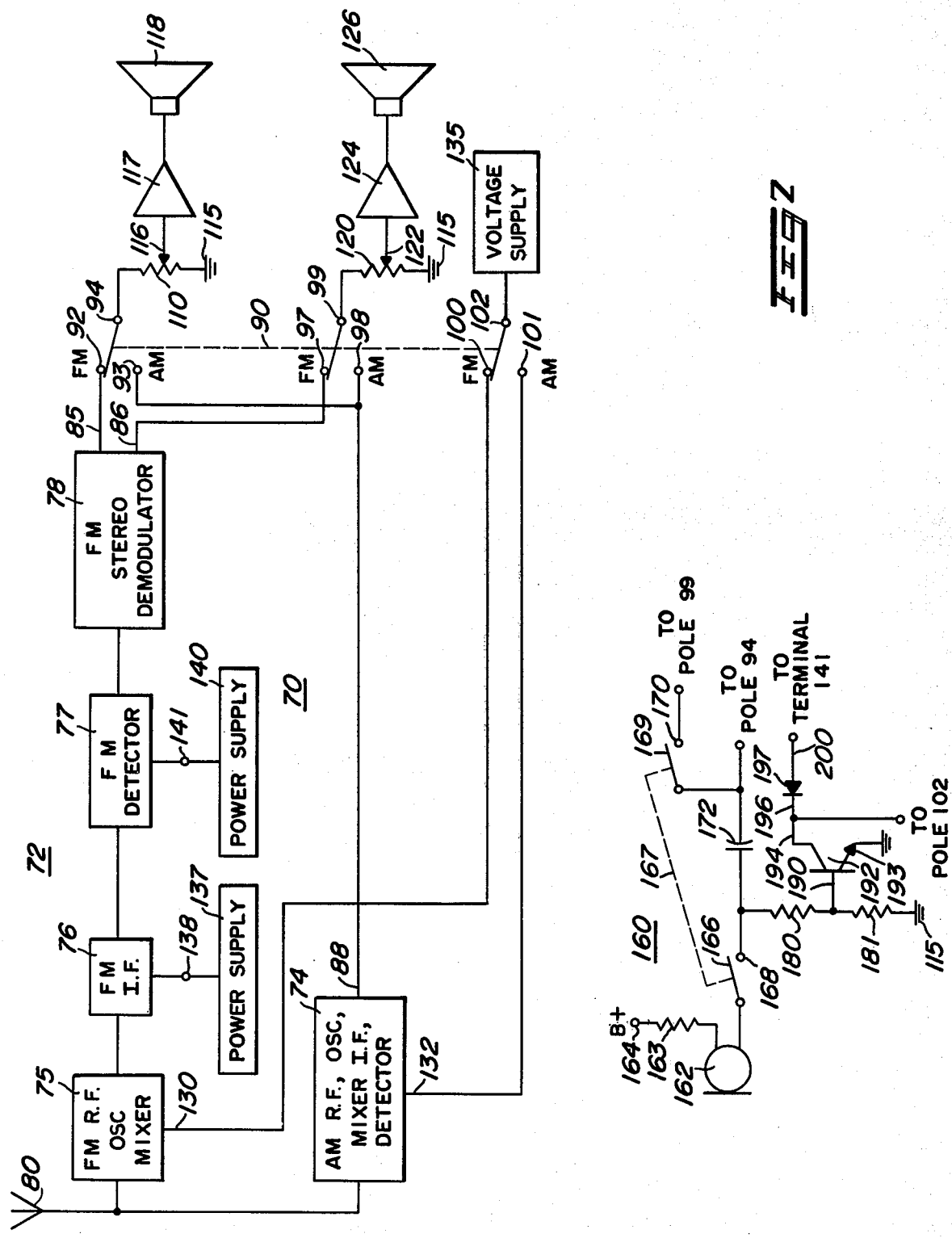

PUBLIC ADDRESS/RADIO SWITCHING SYSTEM

BACKGROUND

This invention relates to combination radio/public address systems and particularly to means of switching the same.

It is well known in the art to use the audio amplifier section of a radio receiver to amplify signals other than from the radio tuner portion. U.S. Pat. No. 2,528,636 to Cisin illustrates a switching scheme wherein the audio amplifier of a radio receiver is used to amplify signals transmitted through a telephone system. Signals derived from pickups located in a piano are routed through the audio section of a radio receiver in U.S. Pat. No. 1,994,889 to Hammond. As a further example, U.S. Pat. No. 3,283,076 to Moore illustrates a switching scheme whereby a radio tuner, a phonograph, or microphone outputs are routed through a common amplifying system.

In general, the required switching operation involves modifications to the existing radio circuitry. For example, the lead to the input of the amplifier must be cut with appropriate switching circuitry inserted to accomplish the multifunction operation. The switches, either manual or relays, are expensive and take up considerable space, which, in mobile applications, is a considerable disadvantage. Furthermore, many such switching schemes are subject to radio feedthrough. Radio feedthrough occurs when the amplifier is being used for other than radio signal amplification yet the radio pickup can be detected in the background. This of course is annoying and distracting.

A public address system may use the radio receiver's audio amplifier with a microphone input. A good microphone for public address applications is the Shure Model 414C which includes a build-in preamp and a pair of ganged leaf switches in one self contained unit. As with most microphone units, the 414C is desiged to be operated into a fixed load for maximum performance.

OBJECTS OF THE INVENTION

It is an object of the present invention, therefore, to provide a system for switching several inputs to the audio amplifier state of a conventional radio receiver without any alteration to the basic circuitry of the radio receiver.

It is a further object of the invention to provide a switching system which uses a minimum of components, and which is small in size and inexpensive to manufacture.

A further object of the present invention is to provide a system which includes a microphone input, and which provides the proper load to the microphone.

Briefly, the invention includes a radio receiver which is comprised of a tuner section and an audio amplifier section and in which an audio signal source, other than the radio tuner, has an electrical gain stage which is biased to conduct a quiescent current. The latter signal source is optimally operable when working into a fixed load.

A switching system, when activated, couples the signal from the signal source to the preamp of the audio amplifier. When inactivated, the switch isolates the preamp from the tuner thus reducing feedthrough. A series connected resistance element and semiconductor junction are affixed to the input of the audio amplifier through a capacitive coupling device. In radio operation, the semiconductor junction carries no net DC current, and therefore, assumes a very large resistance acting to isolate the series load from the audio amplifier. However, when it is desired to amplify signals from the signal source, a means couples the quiescent current of the microphone gain stage to the semiconductor junction which reduces to a lower resistance. The series element resistance is of predetermined value whereby the microphone preamplifier works into its ideal load. The semiconductor junction may be part of a multi-junction device which in turn disables the tuner portion when the signal source is coupled to the audio amplifier, thus further preventing feedthrough.

BRIEF DESCRIPTION OF THE DRAWINGS

FIG. 1 illustrates a preferred embodiment of the invention when used to switch a PA system into a conventional AM radio;

FIG. 2 illustrates a preferred embodiment of the invention when used to switch a PA system into a conventional two channel FM/AM radio.

DETAILED DESCRIPTION OF THE PREFERRED EMBODIMENTS OF THE INVENTION

FIG. 1 illustrates a conventional AM radio receiver, indicated generally at 10 comprised of a tuner stage 12 and an audio amplifying stage 14. The tuner consists of an antenna 15, an RF amplifying state 16, a converter stage 17, an IF amplifier stage 18, and a detector stage 20. The detector stage 20 is shown containing the detector diode 22 whose function is well known in the art. The audio amplification stage couples to the output of the detector 20 stage and includes a volume control potentiometer 25 the tap of which connects to an audio amplifier 27 whose output couples to a speaker 29.

The add-on public address circuitry indicated generally at 30 consists of a microphone with built in preamplifier 32 which is biased through biasing resistor 33 to a power supply 34. The output of the microphone preamplifier 32 connects to one terminal 41 of a double pole, single throw switch 40. When activated, the above-mentioned pole 41 connects to terminal 43. Similarly, when switch 40 is activated the second pole 45 connects to a corresponding terminal 47. Connected in series between ground 50 and terminal 43 are resistor 52 and semiconductor diode 53. As shown the anode of the diode connects to circuit ground 50.

As above mentioned, the microphone in preamplifier unit 32 consists of a transducing element coupled to a preamplifier. The preamplifier is biased to conduct a quiescent DC current.

Connection of the public address add-on circuitry to the radio receiver is as follows. Pole 45 of switch 40 connects to the cathode side of the detector diode 22. The terminal 47 corresponding to pole 45 connects to circuit ground 50. The terminal 43 corresponding to pole 41 couples through a series connected capacitor 60 to the junction of the anode of detector diode 22 and the top of the volume control potentiometer 25. No alterations of the existing receiver are made.

Circuit operation is as follows. With the system switched to the radio mode, i.e., with the switch poles, as shown, disconnected from their respective terminals, the only connection of the preamplifier circuitry to the radio receiver is the series connection of capacitor 60, resistor 52, and diode 53. Since the diode 53 is capacitively coupled, there is no net DC current through the diode and, in the well known manner, the diode resistance is quite high. Due to the high diode resistance, there is minimal loading of the preamp circuitry on the existing radio receiver. To switch the system to the public address mode the switch 40 is activated thereby accomplishing two effects. First, the cathode of the detector diode 22 is grounded thereby disabling audio signals from the tuner. This is advantageous since, otherwise, radio signals would continue to be fed through to the audio amplifier. Activating the switch also causes the quiescent current from the mike preamplifier 32 to flow through the diode 53. The current greatly reduces diode resistance tending to take the diode's anode to near ground potential. Thus, the microphone preamplifier 32 sees resistor 52 as its load, which is desirable since 52 has been selected to provide an optimally operable load to the preamp. Audio signals from the microphone preamplifier 32 are now fed via pole 41 terminal 43 and capacitor 60 to the volume control 25 of the audio amplifying stage 14. These are amplified in a normal manner and applied to the speaker 29 where they are transduced to audibility. The existing radio receiver volume control can be used to vary the level of microphone amplification.

FIG. 2 illustrates a preferred embodiment of the invention wherein public address add-on circuitry is switchably amplified through the audio amplifier of a two channel AM/FM receiver. The tuner section 70 is comprised of an FM tuner 72 and an AM tuner 74. The FM tuner 72 has an FM RF stage with oscillator and mixer 75, an FM IF amplification stage 76, an FM detector stage 77 and a stereo demodulator stage 78. The AM tuner portion 74 is shown having an AM RF stage, an oscillator stage, a mixer stage, an IF stage and a detector stage. An antenna 80 couples RF signals to both the FM and AM tuner portions. The stereo demodulator 78 is shown producing two outputs, the first 85 corresponding to the left channel information of a stereo broadcast and the second 86 corresponding to the right channel. The AM tuner has a single, monophonic output at 88. The tuner outputs connect to terminals of a triple pole, double throw switch 90. The first of the three switch portions has a first terminal 92, a second terminal 93 and a corresponding pole 94 which connects to either the first or the second terminals. The second portion of the switch 90 is comprised of a first terminal 97, a second terminal 98 and a pole 99 which connects to one of the terminals. The final portion of the switch has a first terminal 100, a second terminal 101 and a pole 102 which connects to one of the terminals. The first terminal 92 of the first portion of the switch connects to the left channel output 85 of the FM stereo demodulator 78, whereas the second terminal 93 connects to the AM tuner output 88. The pole 94 of the first portion of the switch connects to a volume control potentiometer 110 whose opposite end connects to ground 115. The potentiometer 110 is provided with a movable tap 116 which connects to the input of an audio amplifier 117. The amplifier's output couples to a speaker 118. The first terminal 97 of the second switch connects to the right channel output 86 of the FM stereo demodulator, and the second terminal 98 also connects to the output 88 of the AM tuner portion 74. The corresponding pole 99 of the terminals connects to a second volume control potentiometer 120 whose opposing end also connects to ground 115. Potentiometer 120 has a movable tap 122 which couples to the input of the second audio amplifier 124 which in turn drives a second loudspeaker 126. The final portion of the switch 90 has its first terminal 100 connecting to a power supply input 130 to the FM RF, oscillator, and mixer stage 75. The second terminal 101 connects to a power supply input 132 of the AM tuner portion 74. The pole 102 of the final switch portion connects to a voltage supply 135 which produces an output voltage suitable for operating either the FM RF front end 75 or the AM tuner portion 74. The FM IF stage 76 is supplied bias power from a separate supply 137 which has an output terminal 138. Similarly, the FM detector stage 77 is powered from a separate supply 140 which has an output terminal 141.

The public address add-on circuitry shown generally at 160 is comprised of a microphone with built in preamp 162 coupled through a bias resistor 163 to a bias supply 164. Internal to the microphone with preamp 162 is an acoustic to electrical transducing element coupled to an electrical gain stage which is biased to conduct a quiescent direct current. The output from the microphone with preamp 162 connects to the first pole 166 of a double pole, single throw switch 167. When activated the first pole 166 connects to the first terminal 168 in unison with a second pole 169 which connects to the second terminal 170. The first terminal 168 is coupled through a capacitor 172 to the second pole 169. The first terminal 168 is coupled to ground potential 115 through a first preselected resistor 180 and a second series resistor 181. The tap of resistors 180 and 181 connects to the base 190 of a transistor 192 whose emitter 193 connects to ground potential and whose collector 194 connects to the cathode 196 of diode 197.

Connections from the PA add-on circuitry to the radio receiver 72 are as follows. The second pole 169 of the switch 167 connects to the first pole of switch 90. The second terminal 170 of switch 167 connects to pole 99 of switch 90. The cathode 196 of diode 197 connects to the third pole 102 of the switch 90, and the anode 200 of diode 197 connects to the output terminal 141 of power supply 140. No alterations whatsoever are made to the existing radio circuitry.

Operation of the circuitry is as follows. When signals from the tuners are to be fed to the audio amplifying section the switch 167 is as shown in FIG. 2, i.e., pole 166 is disconnected from terminal 168 and pole 169 is disconnected from terminal 170. In this configuration there are three connections from the public address add-on circuitry to the radio receiver 70. First there is the connection from the first volume control potentiometer 110 through capacitor 172 to earth via resistors 180, 181 and transistor 192. Resistor 181 is chosen to be a high resistance, such as 1 megohm, thus minimizing any loading effects on the radio receiver through this branch of the PA circuitry. Further, as no DC bias is available to the base 190 of transistor 192 the base emitter junction is not forward biased and therefore is also of a very high impedance. Thus, the loading to potentiometer 110 through pole 94 is negligable. The remaining connections made to the radio receiver are via the anode 200 and cathode 196 of diode 197. However, since these connections are through the collector 194 of transistor 192 which is in the off state the impedance is quite high and there is negligable loading on terminal 141 of power supply 140 or the pole 102 connected to the voltage supply 135. Also, since voltage supply 135 operates at a voltage very nearly equal to the voltage at power supply 140, diode 197 is not biased in the forward direction.

When switch 167 is activated the public address system is coupled to the audio amplifiers. This is seen as follows. The quiescent current of the microphone preamp 162 is coupled through resistor 180 to the base 190 of transistor 192, thereby to activate the transistor. When activated, the collector 194 of transistor 192 approaches ground potential and, in so doing, reduces both voltage supply 135 and voltage supply 140 to ground potential. Thus, either the FM RF oscillator and mixing stage 175 or the AM RF, oscillator, mixer, IF, and detector stage 174 will be biased to nonconduction, depending on whether the receiver is in the FM or AM mode. Also the FM detector 77 will be biased off. Thus both the FM tuner portion 72 and the AM tuner portion 74 are disabled eliminating the possibility of radio feedthrough to the audio section. As above mentioned, optimum operating characteristics of the mike and preamp 162 occur when the preamp is biased with a fixed load. Resistor 180 is chosen to properly load the preamp 162 and, as the emitter base junction of transistor 192 is on effectively shorting out resistor 181, resistor 180 constitutes the only load seen by the preamp. Finally, the signals produced by the mike and preamp 162 are coupled to the first pole 166 of switch 167 to the terminal 168 and there through capacitor 172 to the first audio preamplifier stage including volume control 110, audio amplifier 117 and speaker 118. The same microphone signal information is similarly transmitted through pole 167 and terminal 170 to the second audio preamplifier stage comprised of volume control 120, amplifier 124, and speaker 126 via pole 99. Since the volume controls contained within the radio receiver are in series with the signal from the microphone, they act to vary the volume of the microphone signal to the speaker.

Thus, a switching system is shown which, using a minimum of small and inexpensive parts, couples the output from the signal source through the audio amplifier section of a conventional radio receiver without modifying the existing circuitry of the radio receiver. Further, means are disclosed switchably operating the microphone output of a public address system into an optimum load.

While preferred embodiments of the invention have been described, countless variations and modifications thereof are possible, all of which fall within the true spirit and scope of the invention.

I claim:

1. In combination with a radio receiver having a tuner and an audio amplifier coupled thereto
 a signal source means including an electrical gain stage, the gain stage biased to conduct a quiescent current, the signal source means optimally operable with a fixed load,
 a switching means operable in a first or a second state, the switching means operable in the second state to couple the source means to the audio amplifier and operable in the first state to decouple the source means from the audio amplifier,
 a load means including a semiconductor device series connected to a load element selected to optimally operate the signal source means, the device having a pair of electrodes and an internal resistance therebetween, the resistance relatively low in response to a common current flowing from the first to the second electrode, the resistance otherwise relatively high,
 means coupling the source means quiescent current to the load means device in response to the switching means assuming a second state.

2. The combination of claim 1 wherein the source means includes a microphone having an acoustic to electric transducing element.

3. The combination of claim 1 wherein the switching means is further operable in the second state to disable the tuner.

4. The combination of claim 1 wherein the switching means includes a mechanically activated switch coupled to control the state of the switching means.

5. The combination of claim 1 wherein the load means couples through a DC blocking device to the audio amplifier and is permanently affixed thereto.

6. The combination of claim 1 wherein the semiconductor device is a diode having its anode as the first electrode and its cathode as the second electrode.

7. The combination of claim 1 wherein the semiconductor device is an NPN transistor having its base as the first electrode and its emitter as the second electrode.

8. The combination of claim 7 wherein the transistor's collector is coupled to the tuner whereby the tuner is disabled in response to the switching means assuming the second state.

9. A public address and radio receiver system comprising:
 a radio receiver having a tuner and an audio amplifier,
 a microphone means including a transducing element coupled to an electrical gain stage, the gain stage biased to conduct a quiescent current,
 a switching means operable in an active or an inactive state,
 a semiconductor device having a gate terminal, a first terminal and a second terminal, the first and second terminals having a resistance therebetween, the resistance relatively low corresponding to gate current, the resistance otherwise high,
 the switching means coupling the microphone means to the audio amplifier in the activated state,
 the switching means further coupling the quiescent current to the gate terminal in the activated state, and
 means disabling the tuner responsive to a low device resistance.

10. The combination of claim 9 wherein the semiconductor device is an NPN transistor having its base as the gate terminal, its collector as the first terminal and its emitter as the second terminal.

11. The combination of claim 10 wherein the microphone means further comprises a gain stage optimally operable with a fixed load.

12. The combination of claim 11 wherein the switching means couples the microphone means to the base through a resistance which provides an optimum load to the microphone means.

13. The combination of claim 9 wherein the radio receiver is comprised of a plurality of audio amplifiers.

14. The combination of claim 13 wherein the activated switching means couples the microphone means to all of the audio amplifiers.

* * * * *